United States Patent
Heath, Jr. et al.

(10) Patent No.: US 8,958,499 B2
(45) Date of Patent: Feb. 17, 2015

(54) TRANSMITTING DATA OVER A COMMUNICATIONS CHANNEL

(75) Inventors: Robert W. Heath, Jr., Austin, TX (US); Takao Inoue, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 1074 days.

(21) Appl. No.: 12/997,831

(22) PCT Filed: Jul. 16, 2010

(86) PCT No.: PCT/US2010/042258
§ 371 (c)(1),
(2), (4) Date: Dec. 13, 2010

(87) PCT Pub. No.: WO2012/008968
PCT Pub. Date: Jan. 19, 2012

(65) Prior Publication Data
US 2012/0014473 A1    Jan. 19, 2012

(51) Int. Cl.
H04L 25/49 (2006.01)
H04L 27/00 (2006.01)
H04L 25/03 (2006.01)
H04L 5/00 (2006.01)

(52) U.S. Cl.
CPC .... H04L 25/03961 (2013.01); H04L 25/03949 (2013.01); H04L 5/0023 (2013.01)
USPC ............................. 375/296; 375/324; 375/340

(58) Field of Classification Search
USPC ......... 375/219, 220, 222, 295, 296, 316, 324, 375/340, 346
See application file for complete search history.

(56) References Cited

U.S. PATENT DOCUMENTS

| 8,320,432 | B1* | 11/2012 | Chockalingam et al. ...... 375/219 |
| 2004/0174937 | A1* | 9/2004 | Ungerboeck ................. 375/261 |
| 2004/0253986 | A1 | 12/2004 | Hochwald et al. |
| 2008/0091542 | A1 | 4/2008 | Coutts et al. |
| 2008/0247489 | A1 | 10/2008 | Kou et al. |
| 2009/0010355 | A1 | 1/2009 | Mori et al. |

(Continued)

FOREIGN PATENT DOCUMENTS

| JP | 2005-094255 | 4/2005 |
| WO | 2010/043129 | 4/2010 |

OTHER PUBLICATIONS

Windpassinger, C., "Precoding in multiantenna and multiuser communications", IEEE Transactions on Wireless Communications, 2004, vol. 3, Issue 4, p. 1305-1316.

(Continued)

*Primary Examiner* — Sam K Ahn
*Assistant Examiner* — Linda Wong
(74) *Attorney, Agent, or Firm* — Dorsey & Whitney LLP

(57) ABSTRACT

Techniques for transmitting data over a communications channel are generally described. A value of a property of an inverse of a channel matrix corresponding to the communications channel may be calculated and compared to a threshold value. If the value of the property a first one of greater than or less than the threshold value, at least one transmit message may be altered using a vector perturbation technique to generate data symbols and the data symbols may be precoded using a channel inversion technique to generate precoded data symbols. If the value of the property is the other of greater than or less than the threshold value, the at least one transmit message may be precoded using a channel inversion technique to generate precoded data symbols.

30 Claims, 5 Drawing Sheets

(56) References Cited

U.S. PATENT DOCUMENTS

2009/0175375 A1 7/2009 Zhang
2012/0089890 A1 4/2012 Palanki et al.

OTHER PUBLICATIONS

International Search Report mailed Aug. 26, 2010 for Application No. PCT/US2010/042258.

Airy, M. et al., "Transmit Precoding for the Multiple Antenna Broadcast Channel", 63rd IEEE Vehicular Technology Conference, vol. 3, May 7-10, 2006, Melbourne, VIC , pp. 1396-1400.

Babai, L. , "On Lovasz' lattice reduction and the nearest lattice point problem", Combinatorica, vol. 6, No. 1 Mar. 1986 , pp. 1-13.

Gesbert, D. et al., "Shifting the MIMO paradigm", IEEE Signal Process. Mag., vol. 24, No. 5 2007 , pp. 36-46.

Hassibi, B. et al., "On the sphere-decoding algorithm I. expected complexity", IEEE Trans. Signal Process., vol. 53, No. 8 2005 , pp. 2806-2818.

Hochwald, B. et al., "A vector-perturbation technique for near-capacity multiantenna multiuser communication—part II: perturbation", IEEE Trans. Commun., vol. 53, No. 3 2005 , pp. 537-544.

Lenstra, A. K. et al., "Factoring polynomials with rational coefficients", Mathematische Annalen, vol. 261, No. 4 Dec. 1982 , pp. 515-534.

Peel, C. et al., "A vector-perturbation technique for near-capacity multiantenna multiuser communication—part I: channel inversion and regularization", IEEE Trans. Commun., vol. 53, No. 1 2005 , pp. 195-202.

Song, H. et al., "A Vector Perturbation Technique Based on Eigenvalue Normalization for Multi-User MIMO Downlink", 69th IEEE Vehicular Technology Conference, Apr. 26-29, 2009, Barcelona , pp. 1-5.

Taherzadeh, M. et al., "Communication over MIMO broadcast channels using latice-basis reduction", IEEE Trans. Inf. Theory, vol. 53, No. 12 2007 , pp. 4567-4582.

Taherzadeh, M. et al., "LLL lattice-bases reduction achieves the maximum diversity in MIMO systems", Proc. IEEE Int. Symp. on Info. Theory 2005 , pp. 1300-1304.

Windpassinger, C. et al., "Lattice-reduction-aided broadcast precoding", IEEE Trans. Commun., vol. 52, No. 12 2004 , pp. 2057-2060.

Wubben, D. et al., "Near maximum-likelihood detection of MIMO systems using MMSE-based lattice reduction", Proc. IEEE int. Conf. on Commun., vol. 2 2004 , pp. 798-802.

Goldsmith, et al., "Capacity Limits of MIMO Channels", IEEE Journal on Selected Areas in Communications, vol. 21, No. 5, Jun. 2003, 684-702.

Stojnic, et al., "Asymptotic Analysis of the Gaussian Broadcast Channel with Perturbation Preprocessing", IEEE International Conference on Acoustics, Speech and Signal Processing, vol. 4, May 14-19, 2006, IV-777-IV780.

Yang, et al., "Selective Vector Perturbation Precoding and Peak to Average Power Ratio Reduction for OFDM Systems", IEEE Global Telecommunications Conference, 2008, 1-5.

* cited by examiner

TRANSMITTING DATA OVER A COMMUNICATIONS CHANNEL

STATEMENT REGARDING RESEARCH & DEVELOPMENT

Examples described herein were made with Government support under government contract nos. CCF0514194 AND CNS0626797 awarded by the National Science Foundation to The University of Texas at Austin. The Government has certain rights in the described examples.

CROSS-REFERENCE TO RELATED APPLICATION

This application is a 371 National Stage filing of PCT/US2010/042258 filed on Jul. 16, 2010.

BACKGROUND

Unless otherwise indicated herein, the materials described in this section are not prior art to the claims in this application and are not admitted to be prior art by inclusion in this section.

Multiple-input multiple-output (MIMO) communication systems employ multiple transmit antennas and multiple receive antennas to communicate data symbols over a communications channel. MIMO communication systems may allow a plurality of mobile stations to be serviced utilizing a same frequency band. In this manner, MIMO communication systems may advantageously increase an amount of data the communication systems is able to send to users.

MIMO systems may find use in a variety of applications including, but not limited to, wireless networks, cellular systems including 3G and 4G systems, such as 3GPP LTE-Advanced, local and wide area networks, and wireless broadband systems (such as WiMAX).

Generally, a transmitter in a MIMO system may have a plurality of antennas, designated mathematically by $N_t$ and a plurality of mobile stations, U. The mobile stations U may each have a single antenna for receipt of data over the communications channel. The transmitter, which may be implemented as a base station, may be configured to simultaneously transmit one symbol for each of the mobile stations. Each mobile station may receive signals using one or a plurality of receive antennas.

The communications channel, however, may introduce a variety of non-idealities to a transmitted signal, such as may be caused by multipath interference, reflections, motion of one or more mobile stations, or other properties of a communications channel. A vector of transmit messages to be transmitted over the communications channel may be represented by a vector $s=[s_1 \ldots s_U]^T$, where $T$ denotes a transposition operation. The transmitter may generate precoded data symbols, mathematically denoted x, from the transmit messages s based on channel state information corresponding to the communications channel.

In a communications channel that may generally be considered a slowly varying frequency flat fading channel, a vector of signals y received by the U antennas may then be expressed as y=Hx+n. Where H is a channel matrix corresponding to the communications channel and n is a noise vector. The channel matrix generally refers to a matrix of data which may represent the operation of the communications channel on the transmitted data symbols, including representations of such effects as reflections.

The channel matrix may be reconstructed to form a real-valued equivalent channel matrix $H_r$. If $\Re$ and $\Im$ are used to denote the real and imaginary parts of an argument, respectively, the signal vectors y may be rewritten as:

$$\begin{bmatrix} \Re y \\ \Im y \end{bmatrix} = \begin{bmatrix} \Re H & -\Im H \\ \Im H & \Re H \end{bmatrix} \begin{bmatrix} \Re x \\ \Im x \end{bmatrix} + \begin{bmatrix} \Re n \\ \Im n \end{bmatrix}$$

The real-valued equivalent system model of the signals y may be written $y_r = H_r x_r + n_r$.

To generate the precoded data symbols x, channel inversion techniques may be used. Channel inversion techniques have been described, for example, in C. Peel, et. al., "A vector-perturbation technique for near-capacity multiantenna muhiuser communication—part I: channel inversion and regularization," *IEEE Intl. Symp. on Circuits and Systems* (*ISCAS*), 2007, pp. 673-676, which is hereby incorporated by reference in its entirety for any purpose. Channel inversion techniques may generate the precoded data symbols $x_r$ in accordance with an equation $x_r=(P_r s_r)/\sqrt{\gamma}$ where $P_r = H^*_r (H_r H^*_r)^{-1}$, the pseudo inverse of the real-valued equivalent channel matrix $H_r$, and $\gamma = \|P_r s_r\|^2$ where $\|\ \|$ denotes the 2-norm of the enclosed argument. $\gamma$ therefore may be considered a power normalization factor, which ensures the total transmit energy vector has a unitary magnitude. In this manner, channel inverse techniques generally alter transmit messages using an inverse of the channel matrix.

Vector perturbation techniques may also be used to generate the precoded data symbols. Vector perturbation techniques are described, for example, in B. Hochwald, et. al., "A vector-perturbation technique for near-capacity multiantenna multiuser communication—part II: perturbation," *IEEE Trans. Commun.*, vol. 53, no. 3, pp. 637-544, 2005, which is hereby incorporated by reference in its entirety for any purpose. Vector perturbation techniques may perturb the transmit messages by a scaled integer vector. Vector perturbation may be applied in combination with channel inversion techniques, described above, such that the precoded data symbols $x_r$ may be expressed as $x_r=(P_r/\sqrt{\gamma})(s_r+\tau l_r)$ where $\tau$ is a fixed scalar value, and $l_r$ is a 2U-dimensional vector with integer entries. The normalization factor for maintaining unit transmit energy may now be given by $\gamma = \|P_r(s_r+\tau l_r)\|^2$. There are a variety of methods and considerations for selecting the scalar $\tau$ and vector $l_r$, described for example in B. Hassibi et. al., "On the sphere-decoding algorithm I. Expected complexity," *IEEE Trans. Signal Process.*, vol. 53, no. 8, pp. 2806-2818, 2005 and C. Windpassinger, et. al., "Lattice-reduction-aided broadcast precoding," *IEEE Trans. Commun.*, vol. 52, no. 12, pp. 2057-2060, 2004, both of which are incorporated by reference herein in their entirety and for any purpose.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings.

In the drawings.

SUMMARY

Figure 1:
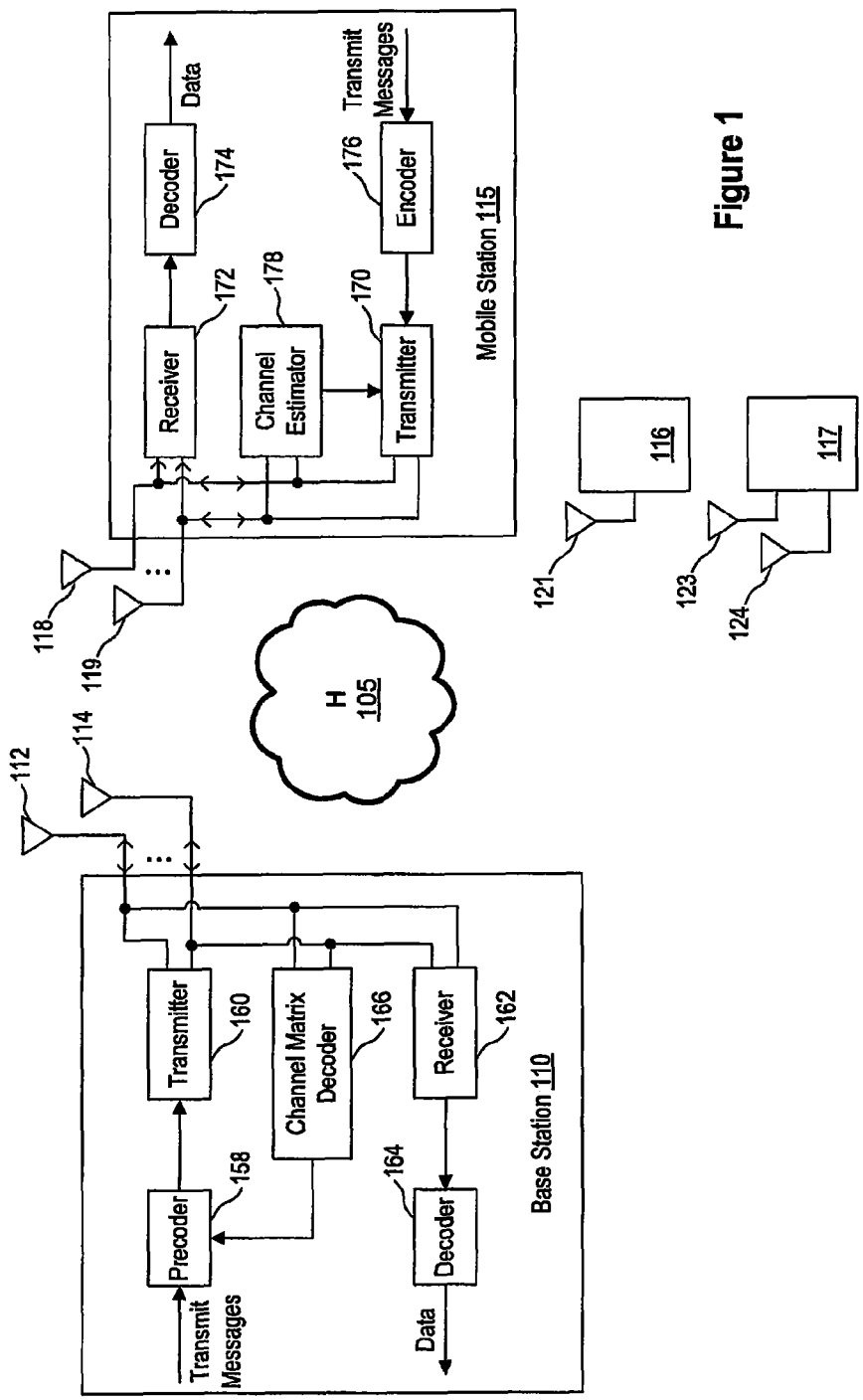
FIG. 1 is a schematic illustration of an example system that is configured for communication over a communications channel in accordance with at least some examples of the present disclosure.

The present disclosure describes examples of a method of transmitting data over a communications channel. Some example methods may include calculating a value of a property of an inverse of a channel matrix corresponding to the communications channel and determining when the value of the property satisfies a condition. When the value of the property satisfies the condition, some example methods proceed by altering at least one transmit message using a vector perturbation technique to generate data symbols, and precoding the data symbols using a channel inversion technique to generate precoded data symbols. When the value of the property fails to satisfy the condition, some example methods proceed by precoding the at least one transmit message using a channel inversion technique to generate precoded data symbols for transmission over the communication channel. Example methods may further include receiving the precoded data symbols at a transmitter, and transmitting the precoded data symbols over the communications channel.

The present disclosure describes examples of base stations for transmitting data symbols over a communications channel. The base station may include a precoder and a transmitter. The precoder may be configured to receive a transmit message for transmission over the communications channel. The precoder may be configured to compare the value of the property to a threshold value. The precoder may be configured to alter at least one transmit message using a vector perturbation technique to generate data symbols, and output a transmission signal corresponding to either the at least one transmit message or the altered data symbols in accordance with the comparison. The transmitter may be configured to receive output transmission signal from the precoder and transmit the transmission signal over the communications channel.

The present disclosure describes examples of computer readable media. Example computer readable media may be encoded with executable instructions for a precoder of a base station. The executable instructions may include instructions for calculating a value of a property of an inverse of a channel matrix corresponding to the communications channel and determining when the value of the property satisfies a condition. The instructions may also include instructions for, when the value of the property satisfies the condition, altering at least one transmit message using a vector perturbation technique to generate data symbols, and precoding the data symbols using a channel inversion technique to generate precoded data symbols. The instructions may also include instructions for, when the value of the property fails to satisfy the condition, precoding the at least one transmit message using a channel inversion technique to generate precoded data symbols for transmission over the communications channel.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to transmitting data over a communications channel. A value of a property of an inverse of a channel matrix corresponding to the communications channel may be calculated and compared to a threshold value. If the value of the property a first one of greater than or less than the threshold value, at least one transmit message may be altered using a vector perturbation technique to generate data symbols and the data symbols may be precoded using a channel inversion technique to generate precoded data symbols. If the value of the property is the other of greater than or less than the threshold value, the at least one transmit message may be precoded using a channel inversion technique to generate precoded data symbols.

FIG. 1 is a schematic illustration of an example system that is configured for communication over a communications channel in accordance with at least some examples of the present disclosure. A system 100 may be a multiuser multiple-input multiple-output system configured for communication over a communications channel 105. System 100 may include a base station 110 and mobile stations 115, 116, and/or 117. The base station and/or the mobile stations may be operated by users (not shown).

The base station 110 may be configured to communicate with multiple mobile stations 115, 116, and 117. The base station 110 may include antennas 112 and 114, which may be utilized to communicate over the communications channel 105 using multiple antennas for spatial diversity to communicate with multiple users over each frequency.

The mobile station 115 may include antennas 118 and 119 a transmitter 170, a receiver 172, a decoder 174, an encoder 176, and/or a channel estimator 178. Antennas 118 and 119 are coupled to the transmitter 170, the receiver 172 and the channel estimator 178. The channel estimator 176 is also coupled to the transmitter 170. The receiver may be coupled to decoder 174. The encoder 176 may be coupled to the transmitter 170.

The receiver 172 is configured to cooperate with antennas 118 and/or 119 to receive signals from the communications channel 105 and provide the received signals to decoder 174. The decoder 174 is configured to decode signals received from the receiver 172 to provide data. The encoder 176 is configured to encode transmit messages and provide encoded transmit messages to the transmitter 170. Transmitter 170 is configured to cooperate with antennas 118 and/or 119 to transmit the encoded transmit messages to the communications channel 105. The channel estimator 178 is configured to cooperate with antennas 118 and 119 to monitor the communication channel 105 and generate channel state information. The channel state information can be provided from the channel estimator 178 to the transmitter 170. The transmitter 170 can be further configured to transmit the channel state information received from the channel estimator 178 over the communications channel 105.

Mobile stations 116 and 117 may be similarly configured to mobile station 115. The mobile station 116 may include antenna 121. The mobile station 117 may include the antennas 123 and 124. Generally, mobile stations having one antenna, mobile stations having multiple antennas, or both, may be used.

The base station 110 may include antennas 112 and 114, a precoder 158, a transmitter 160, a receiver 162, a decoder 164, and/or a channel matrix decoder 166. Antennas 112 and 114 may be coupled to transmitter 160, receiver 162, and channel matrix decoder 166. The precoder 158 may be coupled to transmitter 160 and channel matrix decoder 166. The receiver 162 may be coupled to decoder 164.

The precoder 158 may be configured to receive transmit messages and generate precoded data symbols for communication over the communications channel 105. The precoder 158 may be configured to select a precoding technique for the precoded data symbols based on a property of the communications channel 105, as will be described further below. The transmitter is configured to receive the precoded data symbols and transmit the precoded data symbols over the communications channel 105 via the cooperative operation of the transmitter 160 and one or more of antennas 112 and/or 114. The receiver 162 is configured in cooperation with antennas 112 and 114 to receive signals from the communications channel 105 and generate received signals. A decoder 164 is configured to receive the received signals and decode received data therefrom. The channel matrix 166 is configured in cooperation with one or more of the antennas 112 and 114 to decode channel matrix information sent over the communications channel 105 from one or more of the mobile stations 115, 116, or 117. The channel matrix decoder 166 is configured to provide a channel estimation signal to the precoder 158, which is indicative of a property of the communications channel 105, which may be used by the precoder 158 to select a precoding technique.

The communications channel 105 may generally include any suitable medium for transmitting electromagnetic signals. The communications channel 105 may be characterized by the channel matrix H describing the operation of the communications channel 105 on transmitted symbols. The channel matrix H may provide a representation of effects such as reflections in the communications channel. The channel matrix H may vary over time, and may be calculated periodically in some examples. While a single communications channel 105 is illustrated in FIG. 1, any number of communications channels may be used.

Any number of mobile stations may be included in the communications system 100, including the mobile stations 115, 116, and 117. Although not shown, the mobile stations 116 and 117 may include analogous components to those shown in mobile station 115. The mobile stations may not be physically mobile in some examples. The mobile stations may be configured to receive and decode data symbols communicated over the communications channel 105. Each mobile station may include a single receive antenna, or may include multiple receive antennas. One or more of the mobile stations may be configured to calculate the channel matrix H and provide data indicative of the channel matrix to the base station 110.

Not all components of the mobile station 115 are shown in FIG. 1, and any of a variety of components useful for the sending and receiving of data symbols may be included in the mobile station 115 including, but not limited to, modulators, demodulators, analog-to-digital converters, and digital-to-analog converters.

The base station 110 may include any number of antennas, including two or more antennas, such as the antennas 112 and 114. The base station 110 may be configured for MIMO communications over the communications channel 105 using one or more of the antennas. The base station 110 may be configured to dynamically select an encoding technique for data symbols based on channel state information, as will be described further below.

Any of a variety of transmitter implementations may be used to implement the transmitters 160 and 172. The transmitters are coupled to the antennas of the base station 110 or mobile station 115, respectively, to provide precoded data symbols for transmission over the communications channel 105.

Any of a variety of receiver implementations may be used to implement the receivers 162 and 172. The receivers are coupled to the antennas of the base station 110 or mobile station 115, respectively, to receive precoded data symbols over the communications channel 105.

Any of a variety of decoder implementations may be used to decode the signals received by the receivers 162 and 172, respectively. Further, any of a variety of encoder implementations may be used to implement the encoder 176 used to encode the signals to be transmitted by the mobile station 115.

Examples of the precoder 158 are described further below. The precoder 158 may utilize different encoding techniques based on the channel matrix of the communications channel 105. In particular, the precoder 158 may select between the use of vector perturbation techniques and channel inversion precoding based on a property of the communications channel 105, as will be described further below.

Figure 2:
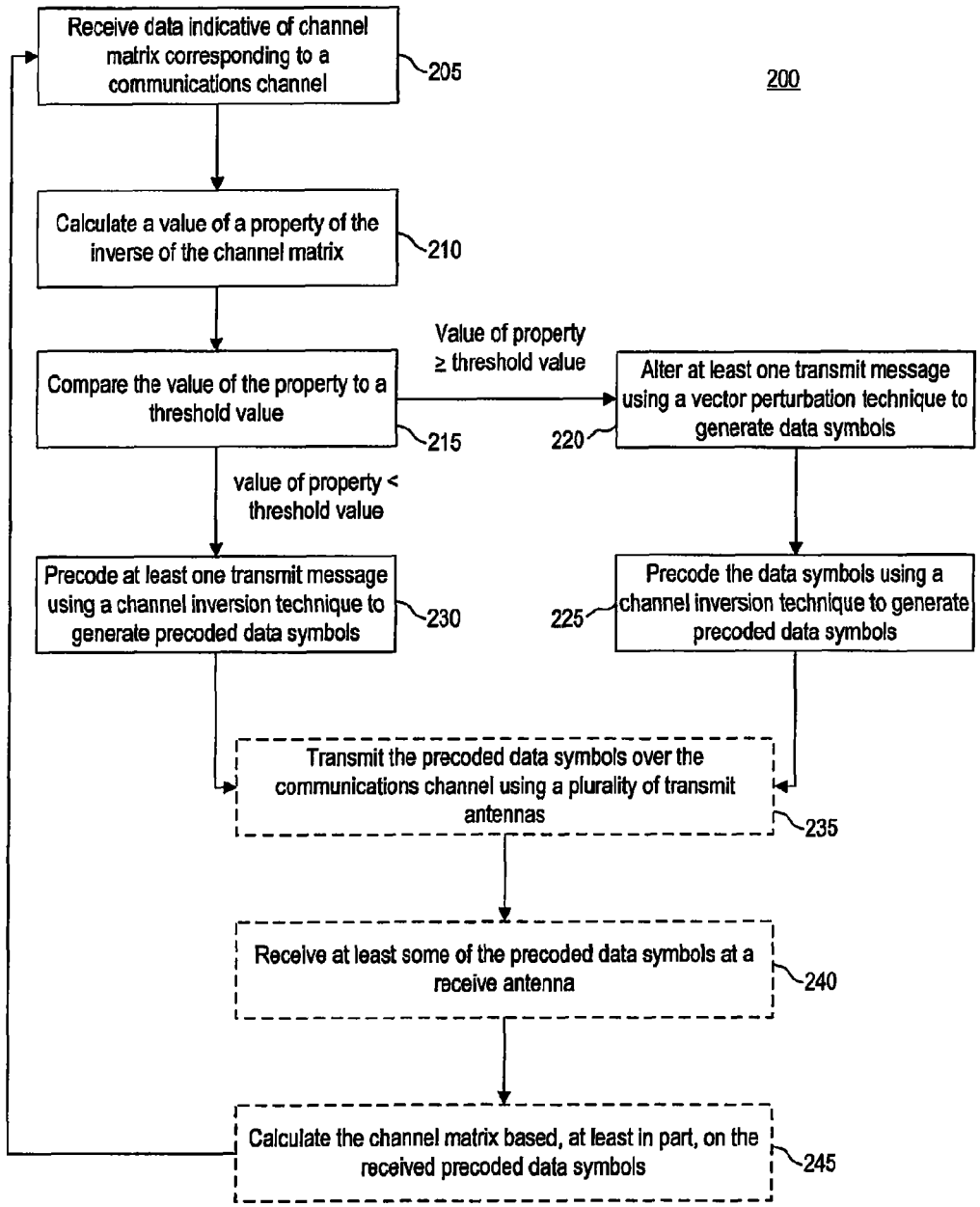
FIG. 2 is a flow diagram illustrating an example method arranged in accordance with at least some examples of the present disclosure.

FIG. 2 is a flow diagram illustrating an example method arranged in accordance with at least some examples of the present disclosure. The method 200 may include one or more functions, operations, or actions as is illustrated by one or more of blocks 205, 210, 215, 220, 225, 230, 235, 240 and/or 245.

The example method 200 may begin at block 205, "receive data indicative of a channel matrix corresponding to a communications channel. Block 205 may be followed by block 210, "calculate a value of a property of the inverse of the channel matrix", Block 210 may be followed by block 215 "compare the value of the property to a threshold value." If the value of the property exceeds or is equal to the threshold value, then block 215 may be followed by block 220, "alter at least one transmit message using a vector perturbation technique to generate data symbols." Block 220 may be followed by block 225, "precode the data symbols using a channel inversion technique to generate precoded data symbols.". Block 225 may be followed by block 235. If the value of the property at block 215 fails to exceed or equal the threshold, then block 215 may be followed by block 230, "precode at least one transmit message using a channel inversion technique to generate precoded data symbols." In block 230, "precode at least one transmit message using a channel inversion technique to generate precoded data symbols", precoded data symbols may be generated. However, in contrast to block 225, the precoded data symbols from block 230 are generated without first employing a vector perturbation technique. Block 230 may be followed by block 235, "transmit the precoded data symbols may be transmitted over the communications channel using a plurality of transmit antennas." The precoded data symbols may be transmitted by a base station, where multiple transmit antennas may be employed. Block 235 may be followed by block 240, "receive at least some of the precoded data symbols over the communications channel at a receive antenna." Block 240 may be followed by block 245, "calculate the channel matrix based, at least in part, on the received precoded data symbols. Block 245 may be followed by block 205, when subsequent channel matrix information is received over the communications channel.

In block 205, data may be received at a base station indicative of a channel matrix corresponding to the communications channel. Referring back to FIG. 1, for example, information about the channel matrix H may be received over the communications channel 105 by the channel matrix decoder 166 of the base station 110. The channel matrix decoder 166 may decode the channel matrix information and provide the channel matrix information to the precoder 158. The information may include, for example, coefficients of the channel matrix. The information may identify the communications channel to which it pertains. Other transmitted data, such as transmit messages, may be received and decoded by the receiver 162 and decoder 164. As was mentioned above, the channel matrix represents the operation of the communications channel on transmitted symbols. The channel matrix may be inverted to obtain an inverse channel matrix, which may be used in channel inversion techniques and other operations described further below.

In block 210, a property of the inverse of the channel matrix may be calculated, for example by the precoder 158 of the base station 110 of FIG. 1. As will be described further below, the property calculated in block 210 may provide an estimate of uneven power distribution among the plurality of transmit antennas. Recall, as described above, the inverse of the channel matrix may be used to generate precoded data symbols. However, operating on transmit messages with the inverse of the channel matrix may unevenly distribute power among a plurality of transmit antennas. Accordingly, a value of a property of the inverse of the channel matrix may be calculated that corresponds to a measure of the power distribution to multiple transmit antennas. In some examples, the property may equal a ratio of two singular values of the inverse of the channel matrix. The ratio may be used as an indication of how uneven the power distribution to the plurality of transmit antennas may be. Mathematically, the singular value decomposition (SVD) of the inverse channel matrix may be given by $P_r = U \Sigma V^*$ where the diagonal matrix $\Sigma$ contains ordered singular values along the diagonal of the matrix which may be expressed as $\sigma_1 \geq \sigma_2 \geq \ldots \geq \sigma_{2Nt}$ where $N_t$ is the number of transmitting antennas. The ratio calculated in block 210 may be the ratio of the largest to the smallest singular values $\sigma_1/\sigma_{2Nt}$, which ratio may also be referred to as the condition number $\kappa$ of the communications channel. The condition number may provide a measure of skew between major and minor axes by the transformation $P_r$. Although the ratio is described above as a ratio of a largest to a smallest singular value, the ratio of the smallest to the largest value may be used in other examples.

In block 215, the value of the property may be compared to a threshold value by, for example, the precoder 158 of the base station 110. The comparison with the threshold value may determine in part how transmit messages are precoded, as will be described further below. If the value of the property is on one side of or equal to the threshold value, vector perturbation techniques may be used, for example by the precoder 158 of FIG. 1. However, if the value of the property is on the other side of the threshold value, vector perturbation techniques may not be used. When vector perturbation techniques are not used, channel inversion techniques alone may be used. In this manner, the computational expense of vector perturbation may not be incurred when the power imbalance among multiple transmit antennas is below a certain level. Any of a variety of techniques and considerations may be incorporated into selection of the threshold value. The selection of the threshold value may also vary in examples in accordance with the particular property of the inverse of the channel matrix that is calculated in block 210. However, in one example, where the value of the property calculated in block 210 corresponds to a ratio of at least two singular values of the inverse of the channel matrix, the threshold value may be mathematically expressed by $\kappa_{TH}$, given by a root of an equation $$\kappa_{TH}^2 - \frac{2}{\beta}\kappa_{TH} + 1 = 0,$$

where $\beta = (\sqrt{2/3})^U$, where U equals the number of mobile stations configured to communicate with the base station precoding the messages. The threshold value may be flexible in some examples, and may approximate a root of the mathematical equation above or chosen in some other manner.

Without being bound by theory, the mathematical expression $$\kappa_{TH}^2 - \frac{2}{\beta}\kappa_{TH} + 1 = 0,$$

may be derived with reference to the Babai bound described, for example, in L. Babai, "On Lovasz' lattice reduction and the nearest lattice point problem," *Combinatorica*, vol. 6, no. 1, pp. 1-13, March 1986, which is hereby incorporated by reference in its entirety for any purpose. The SVD of the inverse channel matrix, described above, may be expressed as bounded by a function of the channel condition number $\kappa$ as follows:

$$\frac{\langle P_n, \hat{P}_n \rangle}{\|P_n\| \|\hat{P}_n\|} \leq \frac{\kappa^2 - 1}{\kappa^2 + 1}.$$

Utilizing Welandt's inequality, the above expression may be set equal to $\cos(\theta)$. Then, the Babai bound of $\sin(\theta) = (\sqrt{2/3})^U$, where U is the number of mobile stations configured to communicate with the base station, may be used to observe $$(\sqrt{2/3})^U = \frac{2\kappa_{TH}}{\kappa_{TH}^2 + 1},$$

which may be rearranged to yield the above equation $$\kappa_{TH}^2 - \frac{2}{\beta}\kappa_{TH} + 1 = 0.$$

The parameter U generally refers to the number of mobile stations configured to communicate with the base station, and may also be referred to as a number of receivers in the communications system. Each mobile station or receiver may utilize one or a plurality of receive antennas. The number of mobile stations U may vary in communications systems. For example, a scheduler operating in a base station may configure the base station to serve U=4 receivers in one example, and U=2 users in another example. The number of receivers serviced may change over time in accordance with performance characteristics of the system. Examples described herein may advantageously improve performance of a communications system as the number of receivers are increased, which may allow the system to serve more receivers for a longer period of time. Examples of communications systems described herein may be optimized for a particular number of receivers, or a particular selection of which receivers to service.

The comparison in block 215 may yield an indication of whether the value of the property calculated in block 210 is greater than or less than or equal to the threshold value. It is to be understood that, depending on the manner in which the ratio is calculated and the threshold value is set, the designation 'greater than' or 'less than' or 'equal to' may take on different meanings. In the example above (and in FIG. 1) where the value of the property calculated in block 210 is a ratio of the largest to the smallest singular values $\sigma_1/\sigma_{2Nt}$ and the threshold value is given by a root of $$\kappa_{TH}^2 - \frac{2}{\beta}\kappa_{TH} + 1 = 0,$$

a ratio greater than or equal to the threshold value may indicate a greater power inequality amongst transmitting antennas than when the ratio is less than the threshold value. However, in an example where, for example, the ratio was calculated as the smallest to the largest singular values $\sigma_{2Nt}/\sigma_1$, the opposite may be the case. Further, the threshold value may be set and the precoder configured such that when the threshold value is equal to the property of the channel matrix, the block 215 may be followed by the block 230 and vector perturbation techniques may not be used.

In block 220, if the ratio is larger than the threshold value, at least one transmit message may be altered, for example by the precoder 158 of FIG. 1, using a vector perturbation technique to generate data symbols. As was described above, a variety of suitable vector perturbation techniques may be used to alter one or more incoming transmit messages with a scalar integer vector. In some examples, the Lenstra-Lenstra-Lovász (LLL) algorithm and Babai approximation may be utilized to perform vector perturbation. The LLL algorithm is described, for example, in M. Taherzadeh, et. al., "LLL lattice-basis reduction achieves the maximum diversity in MIMO systems," Proc. IEEE Int. Symp. on Info. Theory, 2005, pp. 1300-1304, which is incorporated herein by reference in its entirety and for any purpose. As will be described further below, vector perturbation techniques may not be used when the ratio is less than the threshold value. Accordingly, in the block 220 a vector perturbation unit configured to perform the vector perturbation techniques may be activated responsive to the comparison in the block 215.

In block 225, the data symbols generated in the block 220 may be precoded, for example by the precoder 158 of FIG. 1 using a channel inversion technique. Suitable channel inversion techniques were generally described above, and may utilize an inverse of the channel matrix. In this manner, precoded data symbols may be generated for use by a plurality of transmit antennas.

If the value of the property is less than the threshold value, in block 230, at least one transmit message may be precoded, for example by the precoder 158 of FIG. 1, using a channel inversion technique to generate precoded data symbols. Note that vector perturbation techniques may not be used if the value of the property is less than the threshold value in FIG. 2. In this manner, the computational expense of vector perturbation may be avoided when the comparison of the value of the property with the threshold value indicates a power variation between transmit antennas may be below a level represented by the threshold value. As was described above, vector perturbation techniques may be used when the value of the property is greater than the threshold value. Accordingly, in the block 230 the precoder 158 may disable a vector perturbation unit configured to perform the vector perturbation techniques responsive to the comparison in the block 215.

In block 235, the precoded data symbols may be transmitted, for example by the transmitter 160, over the communications channel. The base station 110 may be configured for communication in multiple-input multiple-output (MIMO) mode, and a plurality of transmit antennas, including the antennas 112 and 114 may accordingly be used. Recall that the preceded data symbols may or may not have been generated using vector perturbation techniques, depending on the values in the channel matrix.

In block 240, at least some of the precoded data symbols may be received over the communications channel using at least one receive antenna. Any number of mobile stations may be used to receive precoded data symbols transmitted over the communications channel. In some examples, each mobile station may have one antenna for receipt of preceded data symbols. In other examples, one or more mobile stations may also have more than one antenna. In some examples, the base station itself may receive a transmission sent by the base station itself.

In block 245, the channel matrix may be calculated by a mobile station based, at least in part, on the received precoded data symbols. Known techniques may be used to calculate the channel matrix. Data indicative of the channel matrix may then be communicated back to a transmitter at a base station, and received in block 105. The channel matrix may then be used to select a technique for encoding transmit messages by the precoder 158.

It should be appreciated that the blocks described above may be implemented as a sequence of instructions or program modules running on a computing device, as interconnected machine logic circuits or circuit modules within a device, or some combination thereof. The implementation is a matter of choice dependent on the performance and other requirements of the various embodiments. Some of the blocks described herein may be referred to as state operations, functions, structural devices, actions, and/or modules. The various blocks may be implemented in software, in firmware, in special purpose digital logic, or any combination thereof. It should also be appreciated that in some implementations one or more of the illustrated blocks may be eliminated, combined or separated into additional blocks. These blocks may also be performed sequentially, in parallel, or in a different order than those described herein.

Figure 3:
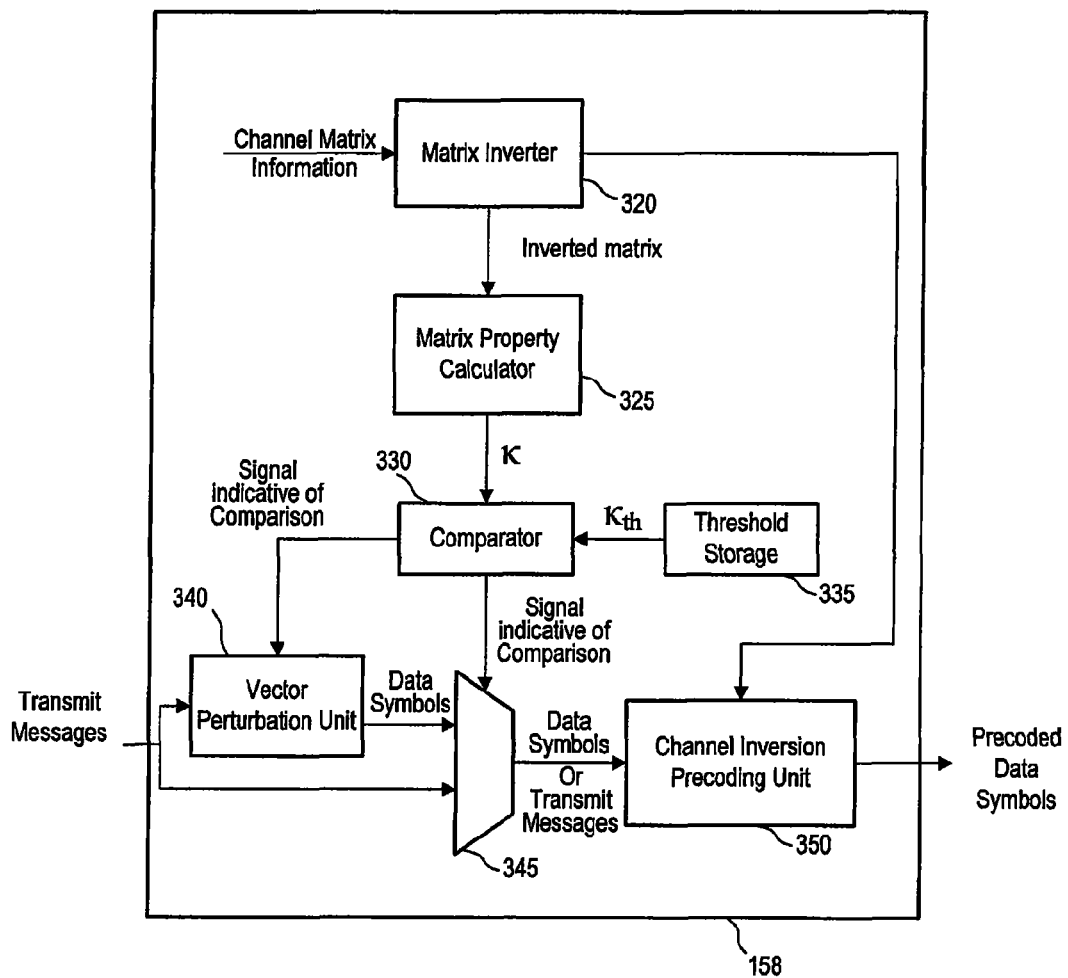
FIG. 3 is a schematic illustration of an example precoder that is configured to precode transmit messages in accordance with at least some examples of the present disclosure.

FIG. 3 is a schematic illustration of an example precoder that is configured to precede transmit messages in accordance with at least some examples of the present disclosure. Recall the precoder 158, shown in FIG. 1, may be used to precode transmit messages into precoded data symbols for transmission over the communications channel 105. FIG. 3 provides a schematic illustration of functional blocks that may be used in the precoder 158, which may include one or more of a matrix inverter 320, a matrix property calculator 325, a comparator 330, a threshold storage 335, a vector perturbation unit 340, a multiplexer 345, and/or a channel inversion preceding unit 350.

The matrix inverter 320 can be configured to receive channel matrix information and calculate an inverse of the channel matrix H. Referring back to FIG. 1, channel matrix information may be received over the communications channel 105 and decoded by the channel matrix decoder 166. The matrix inverter 320 may be coupled to a matrix property calculator 325, which may be configured to calculate a value of a property of the inverse of the channel matrix, and to generate a signal indicative of the value of the property. The comparator 330 may be coupled to the matrix property calculator and configured to receive the signal indicative of the value of the property, and further configured to compare the value of the property to a threshold value and generate a signal indicative of the comparison. The threshold storage 335 may be configured to store one or more threshold values and provide a threshold value to the comparator 330. The vector perturbation unit 340 may be configured to receive transmit messages to be sent by the base station 110 for over the communications channel. The vector perturbation unit may also be configured to alter at least one of the transmit messages using a vector perturbation technique to generate data symbols. The multiplexer 345 may be coupled to the comparator 330 and the vector perturbation unit 340. The vector perturbation unit 340 may receive the signal indicative of the comparison from the multiplexer 345, and may enable or disable responsive to the signal indicative of the comparison. If the comparison indicates vector perturbation techniques will be used, the vector perturbation unit may enable. If the comparison indicated vector perturbation techniques will not be used, the vector perturbation unit may disable. The multiplexer 345 may be configured to receive the at least one transmit message, the data symbols, and the signal indicative of the comparison, the multiplexer may be further configured to output either the at least one transmit message or the data symbols in accordance with the signal indicative of the comparison. The channel inversion preceding unit 350 may be coupled to the multiplexer 345 and configured to receive either the at least one transmit message or the altered data symbols and precede the received symbols using a channel inversion technique to generate precoded data symbols.

It should be appreciated that the blocks described above may be implemented as a sequence of instructions or program modules running on a computing device, as interconnected machine logic circuits or circuit modules within a device, or some combination thereof. The implementation is a matter of choice dependent on the performance and other requirements of the various embodiments. Some of the blocks described herein may be referred to as state operations, functions, structural devices, actions, and/or modules. The various blocks may be implemented in software, in firmware, in special purpose digital logic, or any combination thereof. It should also be appreciated that in some implementations one or more of the illustrated blocks may be eliminated, combined or separated into additional blocks. These blocks may also be performed sequentially, in parallel, or in a different order than those described herein.

The matrix inverter 320 may be configured to calculate an inverse of the channel matrix H. Any suitable technique may be used to calculate the matrix inverse. The matrix inverter 320 may be implemented in hardware, software, or combinations thereof. Processing units utilized to implement the matrix inverse calculator 320 may in some examples be shared with one or more of the remaining components of the base station 110, described further below.

The matrix property calculator 325 may be configured to calculate a value of a property of the inverse of the channel matrix that corresponds to a measure of the power distribution to multiple transmit antennas. In some examples, as mentioned above, the ratio of two singular values of the inverse of the channel matrix may be used as an indication of how uneven the power distribution to the plurality of transmit antennas may be. Accordingly, the matrix property calculator 325 may be adapted to calculate a ratio between at least two of a plurality of singular values of an inverse of a channel matrix, and generate a signal indicative of the ratio. More generally, the matrix property calculator 325 may be configured to receive data from the matrix inverter 320 indicative of all or a portion of the inverse channel matrix. In some examples, the matrix property calculator 325 may be configured to receive one or more singular values of the inverse channel matrix. The matrix property calculator 325 may then be configured to calculate the value of a property of the inverse of the channel matrix and generate a signal indicative of the value of the property. The matrix property calculator 325 may be implemented in hardware, software, or combinations thereof, and processing units used to implement the matrix property calculator 325 may be shared with other transmitter components described herein in some examples.

The comparator 330 may be coupled to the matrix property calculator 325 and the threshold storage 335. The comparator 330 may be configured to receive the signal indicative of the value of the matrix property generated by the matrix property calculator 325 and a threshold value from the threshold storage 335. The comparison implemented by the comparator may be configured to determine whether the value of the property is greater or less than the threshold value. The comparator 330 may be implemented in hardware, software, or combinations thereof, and processing units used to implement the comparator 330 may be shared with other transmitter components described herein in some examples. The comparator 330 may be configured to generate a signal indicative of the comparison and provide the signal to the multiplexer 345 and the vector perturbation unit 340 in some examples.

The threshold storage 335 may be implemented as any type of storage media accessible to the comparator. In some examples, a threshold value calculator (not shown in FIG. 3) may be included in the base station 110 to calculate the threshold value, as has generally been described above. The threshold value may be based on a number of mobile stations the transmitter is configured to service over the communications channel.

The vector perturbation unit 340 may be configured to perturb one or more transmit messages in accordance with a scalar integer vector. The vector perturbation unit may implement any of a variety of vector perturbation techniques, and may be implemented in hardware, software, or a combination thereof. Processing units used to implement the vector perturbation unit 340 may be shared with one or more other transmitter components described herein in some examples. The vector perturbation unit may be configured to receive the signal from the comparator 330 indicative of the comparison between the value of the property and the threshold value. The vector perturbation unit may be configured to enable and disable responsive to the signal indicative of the comparison. That is, when the signal from the comparator indicates that vector perturbation should be performed on one or more transmit messages, the vector perturbation unit 340 may be enabled, while the signal from the comparator indicates that vector perturbation should not be performed, the vector perturbation unit 340 may be disabled. In the example where the value of the property is calculated as a ratio of a largest to a smallest singular value of the inverse channel matrix, the vector perturbation unit may be enabled responsive to an indication the ratio was greater than or equal to the threshold value and disabled responsive to an indication the ratio was smaller than the threshold value. When enabled, the vector perturbation unit 340 may be configured to generate data symbols based on the transmit messages.

The multiplexer 345 may be coupled to the comparator 330, vector perturbation unit 340, and channel inversion preceding unit 350. The multiplexer 345 may be configured to receive the transmit messages to be transmitted over the communications channel, as well as data symbols generated by the vector perturbation unit 340. Responsive to the signal indicative of the comparison, the multiplexer 345 may be configured to select either the output of the vector perturbation unit 340 or the transmit messages themselves to provide to the channel inversion preceding unit 350. That is, responsive to a comparison indicating vector perturbation should be used, the multiplexer may be configured to provide an output of the vector perturbation unit 340 to the channel inversion preceding unit 350. Responsive to a comparison indicating vector perturbation should not be used, the multiplexer 345 may be configured to provide one or more transmit messages to the channel inversion preceding unit 350.

The channel inversion precoding unit 350 may be configured to precode either the transmit messages themselves or the data symbols generated by the vector perturbation unit 240 into precoded data symbols. The channel inversion preceding unit 350 may implement any of a variety of channel inversion techniques, examples of which were generally described above. The channel inversion precoding unit 350 may be implemented in hardware, software, or combinations thereof. Processing units used to implement the channel inversion preceding unit 350 may be shared with other components of the transmitter described herein in some examples.

Figure 4:
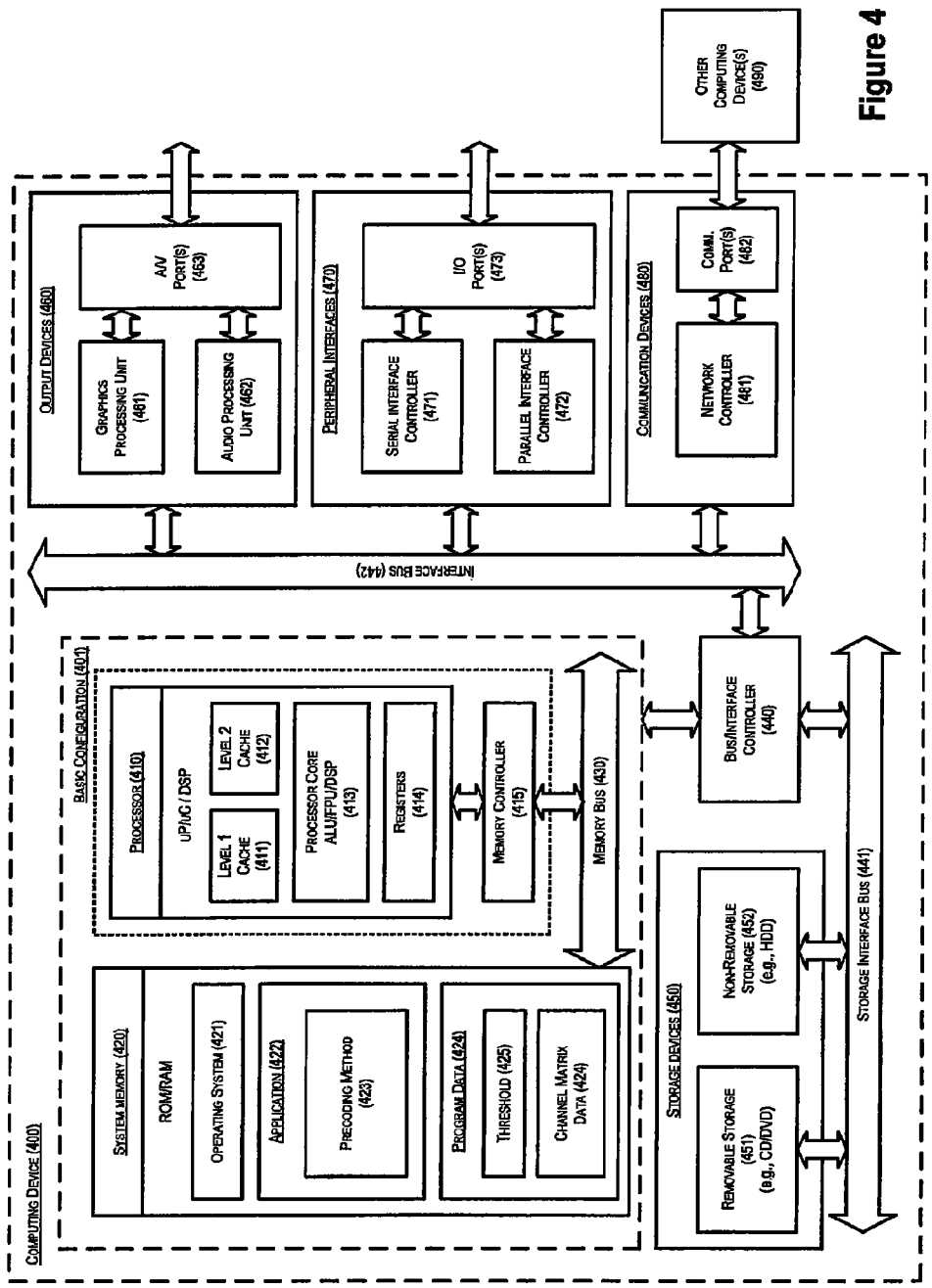
FIG. 4 is a block diagram illustrating an example computing device 400 that is arranged for precoding of transmit messages in accordance with the present disclosure.

FIG. 4 is a block diagram illustrating an example computing device 400 that is arranged for preceding of transmit messages in accordance with at least some examples of the present disclosure. The computing device 400 may, for example, be used to implement the precoder 158 of FIG. 1 in some examples. In a very basic configuration 401, computing device 400 typically includes one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP), or any combination thereof. Processor 410 may include one more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include an operating system 421, one or more applications 422, and program data 424. Application 422 may include a preceding method 423 that is arranged to select a preceding technique and precede transmit messages in accordance with functions described above with reference to FIGS. 2 and 3. Program Data 424 may include threshold data 425 and channel matrix data 424 that is useful for selecting a precoding technique, as described above. In some embodiments, application 422 may be arranged to operate with program data 424 on an operating system 421 such that vector perturbation techniques are used to encode transmit messages when a property of the channel matrix as reflected in the channel matrix data 424 compares in a certain manner with the threshold data 424. This described basic configuration is illustrated in FIG. 4 by those components within dashed line 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

Figure 5:
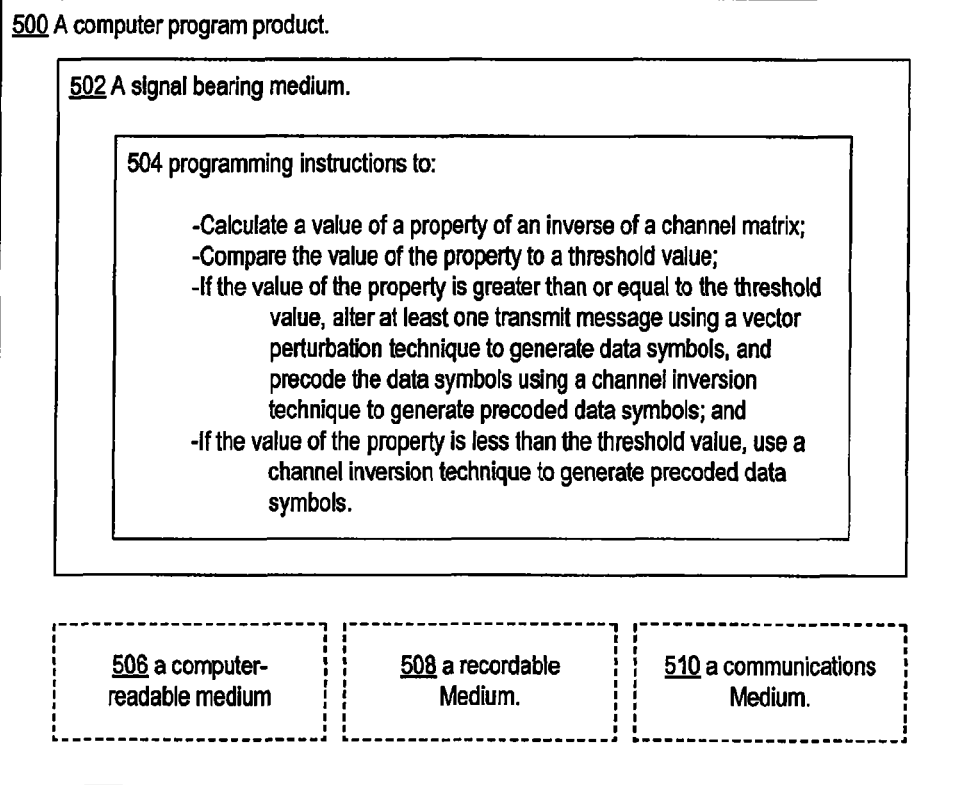
FIG. 5 is a block diagram illustrating an example computer program product 500 that is arranged to store instructions for precoding transmit messages in accordance with the present disclosure.

FIG. 5 is a block diagram illustrating an example computer program product 500 that is arranged to store instructions for precoding transmit messages in accordance with the present disclosure. The signal bearing medium 502 which may be implemented as or include a computer-readable medium 506, a recordable medium 508, a communications medium 510, or combinations thereof, stores instructions 504 that may configure the processing unit to perform all or some of the processes previously described. These instructions may include, for example, one or more executable instructions for calculating a value of a property of an inverse of a channel matrix and comparing the value of the property to a threshold value. The instructions may also include instructions for altering at least one transmit message using a vector perturbation technique if the value of the property is greater than or equal to the threshold value, and precoding the data symbols to generate precoded data symbols. The instructions may also include instructions for using a channel inversion technique without vector perturbation if the value of the property is less than the threshold value. In other examples, the instructions 504 may include instructions for implementing all or a portion of the functions of the precoder described above with reference to FIGS. 2 and 3.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of transmitting data over a communications channel, the method comprising:
    calculating a value of a property of an inverse of a channel matrix corresponding to the communications channel;
    determining when the value of the property satisfies a condition;
    when the value of the property satisfies the condition:
        altering at least one transmit message using a vector perturbation technique to generate data symbols; and
        precoding the generated data symbols using a channel inversion technique to generate precoded data symbols;
    when the value of the property fails to satisfy the condition:
        precoding the at least one transmit message using a channel inversion technique to generate precoded data symbols for transmission over the communications channel;
    receiving the precoded data symbols at a transmitter; and
    transmitting the precoded data symbols over the communications channel.

2. The method of claim 1, wherein the condition is satisfied when the value of the property is greater than a threshold value.

3. The method of claim 1, wherein the condition is satisfied when the value of the property is less than a threshold value.

4. The method of claim 1, further comprising receiving data over the communications channel from a mobile station indicative of the channel matrix corresponding to the communications channel.

5. The method of claim 1, wherein transmitting the preceded data symbols over the communications channel comprises transmitting the precoded data symbols via a plurality of transmit antennas configured for multiple-input multiple-output communications.

6. The method of claim 1, further comprising receiving at least some of the precoded data symbols.

7. The method of claim 1, further comprising receiving at least some precoded data symbols and calculating the channel matrix based, at least in part, on the received precoded data symbols.

8. The method of claim 1, wherein the value of the property comprises a ratio of at least two singular values of the inverse of the channel matrix.

9. The method of claim 8, wherein the ratio of at least two singular values of the inverse of the channel matrix comprises a ratio of a largest to a smallest singular value of the inverse of the channel matrix.

10. The method of claim 1, further comprising determining a number of mobile stations associated with the communications channel; and calculating the threshold value based, at least in part, on the determined number of mobile stations.

11. The method of claim 1, further comprising determining the threshold value, $K_{TH}$, as a root of an equation $$\kappa_{TH}^2 - \frac{2}{\beta}\kappa_{TH} + 1 = 0,$$

where $\beta=(\sqrt{2}/3)^U$; where U equals the number of mobile stations the communications channel is configured to service.

12. The method of claim 1, wherein the channel inversion technique comprises modifying the at least one transmit message using an inverse of the channel matrix.

13. A base station to transmit data symbols over a communications channel, the base station comprising:
a precoder configured to receive a transmit message for transmission over the communications channel, wherein the precoder configured to:
calculate a value of a property of an inverse of a channel matrix corresponding to the communications channel;
compare the value of the property to a threshold value;
alter at least one transmit message using a vector perturbation technique to generate data symbols;
precode one of the at least one transmit message or the generated symbols using a channel inversion technique to generate precoded data symbols, wherein selection, for precode, of the one of the at least one transmit message or the generated data symbols based on the comparison between the value of the property to the threshold value; and
output a transmission signal based on the precoded data symbols; and
a transmitter coupled to the precoder, the transmitter configured to receive output transmission signal from the precoder and transmit the transmission signal over the communications channel.

14. The base station of claim 13, further comprising a plurality of antennas coupled to the transmitter, wherein the plurality of antennas are configured to transmit the precoded data symbols or over the communications channel.

15. The base station of claim 13, wherein the precoder is further configured to calculate the inverse of the channel matrix.

16. The base station of claim 13, further comprising threshold storage coupled to the precoder and configured to store the threshold value.

17. The base station of claim 13, wherein the value of the property comprises a ratio of at least two singular values of the inverse of the channel matrix.

18. The base station of claim 17, wherein the at least two of the plurality of singular values of the inverse of the channel matrix comprise the largest and the smallest singular values of the inverse of the channel matrix.

19. The base station of claim 18, wherein the threshold value is based, at least in part, on a number of mobile stations configured to receive communications from the base station over the communications channel.

20. The base station of claim 18, wherein the threshold value, $K_{TH}$ is given by a root of an equation $$\kappa_{TH}^2 - \frac{2}{\beta}\kappa_{TH} + 1 = 0,$$

where $\beta=(\sqrt{2}/3)^U$; where U equals the number of mobile stations configured to receive communications from the base station.

21. The base station of claim 13, wherein the precoder is configured to enable or disable vector perturbation in accordance with the comparison.

22. A non-transitory computer readable medium encoded with instructions for a precoder of a base station, configured to transmit data over a communications channel, that are executable by one or more processing units, wherein, when executed by the one or more processing units, cause the one or more processing units to perform a method comprising:
calculating a value of a property of an inverse of a channel matrix corresponding to the communications channel;
determining when the value of the property satisfies a condition;
when the value of the property satisfies the condition:
altering at least one transmit message using a vector perturbation technique to generate data symbols; and
precoding the generated data symbols using a channel inversion technique to generate precoded data symbols; and
when the value of the property fails to satisfy the condition:
precoding the at least one transmit message using a channel inversion technique to generate precoded data symbols for transmission over the communications channel.

23. The non-transitory computer readable medium of claim 22, wherein the condition is satisfied when the value of the property is greater than a threshold value.

24. The non-transitory computer readable medium of claim 22, wherein the condition is satisfied when the value of the property is less than a threshold value.

25. The non-transitory computer readable medium of claim 22, further comprising instructions for receiving data over the communications channel from a mobile station indicative of the channel matrix corresponding to the communications channel.

26. The non-transitory computer readable medium of claim 22, wherein the value of the property comprises a ratio of at least two singular values of the inverse of the channel matrix.

27. The non-transitory computer readable medium of claim 26, wherein the ratio of at least two singular values of the inverse of the channel matrix comprises a ratio of a largest to a smallest singular value of the inverse of the channel matrix.

28. The non-transitory computer readable medium of claim 22, further including instructions executable by the one or more processing units that, when executed, cause the one or processing units to further perform the method comprising:
   determining a number of mobile stations associated with the communications channel; and
   calculating the threshold value based, at least in part, on the determined number of mobile stations.

29. The non-transitory computer readable medium of claim 22, further including instructions executable by the one or more processing units that, when executed, cause the one or processing units to further perform the method comprising determining the threshold value, $K_{TH}$, as a root of an equation $$\kappa_{TH}^2 - \frac{2}{\beta}\kappa_{TH} + 1 = 0,$$

where $\beta=(\sqrt{2}/3)^U$; where U equals the number of mobile stations configured for communication over the communications channel.

30. The non-transitory computer readable medium of claim 22, wherein the channel inversion technique comprises modifying the at least one transmit message using an inverse of the channel matrix.

* * * * *

UNITED STATES PATENT AND TRADEMARK OFFICE
CERTIFICATE OF CORRECTION

PATENT NO. : 8,958,499 B2  
APPLICATION NO. : 12/997831  
DATED : February 17, 2015  
INVENTOR(S) : Heath, Jr. et al.

It is certified that error appears in the above-identified patent and that said Letters Patent is hereby corrected as shown below:

In the Specification

In Column 2, Line 15, delete "muhiuser" and insert -- multiuser --, therefor.

In Column 10, Line 26, delete "preceded" and insert -- precoded --, therefor.

In Column 10, Line 34, delete "preceded" and insert -- precoded --, therefor.

In Column 10, Line 64, delete "precede" and insert -- precode --, therefor.

In Column 11, Line 6, delete "preceding" and insert -- precoding --, therefor.

In Column 11, Line 43, delete "preceding" and insert -- precoding --, therefor.

In Column 11, Line 45, delete "precede" and insert -- precode --, therefor.

In Column 13, Lines 13-14, delete "preceding" and insert -- precoding --, therefor.

In Column 13, Line 21, delete "preceding" and insert -- precoding --, therefor.

In Column 13, Line 25, delete "preceding" and insert -- precoding --, therefor.

In Column 13, Line 28, delete "preceding" and insert -- precoding --, therefor.

In Column 13, Lines 32-33, delete "preceding" and insert -- precoding --, therefor.

In Column 13, Line 38, delete "preceding" and insert -- precoding --, therefor.

In Column 13, Line 41, delete "preceding" and insert -- precoding --, therefor.

Signed and Sealed this  
Twenty-eighth Day of July, 2015

Michelle K. Lee  
*Director of the United States Patent and Trademark Office*

CERTIFICATE OF CORRECTION (continued)
U.S. Pat. No. 8,958,499 B2

In Column 14, Line 2, delete "preceding" and insert -- precoding --, therefor.

In Column 14, Line 3, delete "preceding" and insert -- precoding --, therefor.

In Column 14, Line 3, delete "precede" and insert -- precode --, therefor.

In the Claims

In Column 19, Line 52, in Claim 13, delete "generated symbols" and insert -- generated data symbols --, therefor.

In Column 19, Line 55, in Claim 13, delete "symbols based" and insert -- symbols is based --, therefor.